(12) United States Patent
Xue et al.

(10) Patent No.: US 8,472,308 B2
(45) Date of Patent: Jun. 25, 2013

(54) METHOD FOR GENERATING A PREAMBLE SEQUENCE AND A METHOD FOR DETERMINING A CYCLIC SHIFT

(75) Inventors: Yan Xue, Shenzhen (CN); Huanxi Tan, Shenzhen (CN); Peng Hao, Shenzhen (CN); Guanghui Yu, Shenzhen (CN); Junfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 201 days.

(21) Appl. No.: 13/059,475

(22) PCT Filed: Dec. 3, 2008

(86) PCT No.: PCT/CN2008/073314
§ 371 (c)(1),
(2), (4) Date: Feb. 17, 2011

(87) PCT Pub. No.: WO2010/020100
PCT Pub. Date: Feb. 25, 2010

(65) Prior Publication Data
US 2011/0150156 A1  Jun. 23, 2011

(30) Foreign Application Priority Data
Aug. 21, 2008 (CN) .......................... 2008 1 0141979

(51) Int. Cl.
*H04J 11/00* (2006.01)
*H04L 12/26* (2006.01)
*H04W 4/00* (2009.01)

(52) U.S. Cl.
USPC ............................. 370/208; 370/252; 370/328

(58) Field of Classification Search
None
See application file for complete search history.

(56) References Cited

U.S. PATENT DOCUMENTS

2008/0080472 A1    4/2008 Bertrand
2008/0165903 A1*   7/2008 Hooli et al. ................... 375/343
(Continued)

FOREIGN PATENT DOCUMENTS

CN    101217807 A    7/2008
WO    2008081311 A2  7/2008

OTHER PUBLICATIONS

Huawei, Multiple Values of Cyclic Shift Increment NCS, 3GPP Draft; R1-073515, 3rd Generation Partnership Project (3GPP), Mobile Competence Centre; 650, Route Des Lucioles; F-06921 Sophia-Antipolis Cedex; France, vol. Ran WG1, No. Athens, Greece, Aug. 15, 2007 XP050107121, Retrieved on Aug. 15, 2007. Sections 1-3.

(Continued)

*Primary Examiner* — Clemence Han
(74) *Attorney, Agent, or Firm* — McGarry Bair PC

(57) ABSTRACT

A method for generating a preamble sequence and determining a cyclic shift. The method includes: when set a piece of root sequence can only generate one preamble sequence and there is no cyclic shift restriction, setting the cyclic shift step length $N_{CS}$ to be equal to 0 and the corresponding cyclic shift amount $C_v=0$, at this time the root sequence is directly used as the preamble sequence; when set a piece of root sequence can generate a plurality of preamble sequences and there is no cyclic shift restriction, the cyclic shift step length $N_{CS}$ being not equal to 0, at this time the cyclic shift amount $C_v=v \cdot N_{CS}$, wherein $v=0, 1, 2, \ldots, \lfloor N_{ZC}/N_{CS} \rfloor -1$. This method is applied to the situation that a root sequence generates a preamble sequence, and the method for generating the preamble sequence is simple and easy to operate.

9 Claims, 1 Drawing Sheet

U.S. PATENT DOCUMENTS

2009/0073944 A1* 3/2009 Jiang et al. .................... 370/338
2010/0220664 A1* 9/2010 Hooli et al. .................... 370/329
2011/0158104 A1* 6/2011 Frenger et al. ................ 370/241

OTHER PUBLICATIONS

Texas Instruments et al: Sequence Ordering for PRACH in E-UTRA, 3GPP Draft; R1-074145_RA2, 3rd Generation Partnership Project (3GPP), Mobile Competence Centre; 650, Route Des Lucioles; F-06921 Sophia-Antipolis Cedex; France, vol. RAN WG1, No. Shanghai, China; Oct. 2, 2007, XP050107677, Retrieved on Oct. 2, 2007. Sections 1 and 2.

3rd Generation Partnership Project; Technical Specification Group Radio Access Network; Evolved Universal Terrestrial Radio Acess (E-UTRA); Physical Channels and Modulation (Release 8), 3GPP Standard; 3GPP TS 36.211, 3rd Generation Partnership Project (3GPP), Mobile Competence Centre; 650, Route Des Lucioles; F-06921 Sophia-Antipolis Cedex; France, No. V8.1.0, Nov. 1, 2007 pp. 1-54, XP050377533, Section 5.7.2.

Paelo Galli, Supplementary European Search Report, Oct. 31, 2011, 6 pages, European Patent Office, Munich.

* cited by examiner

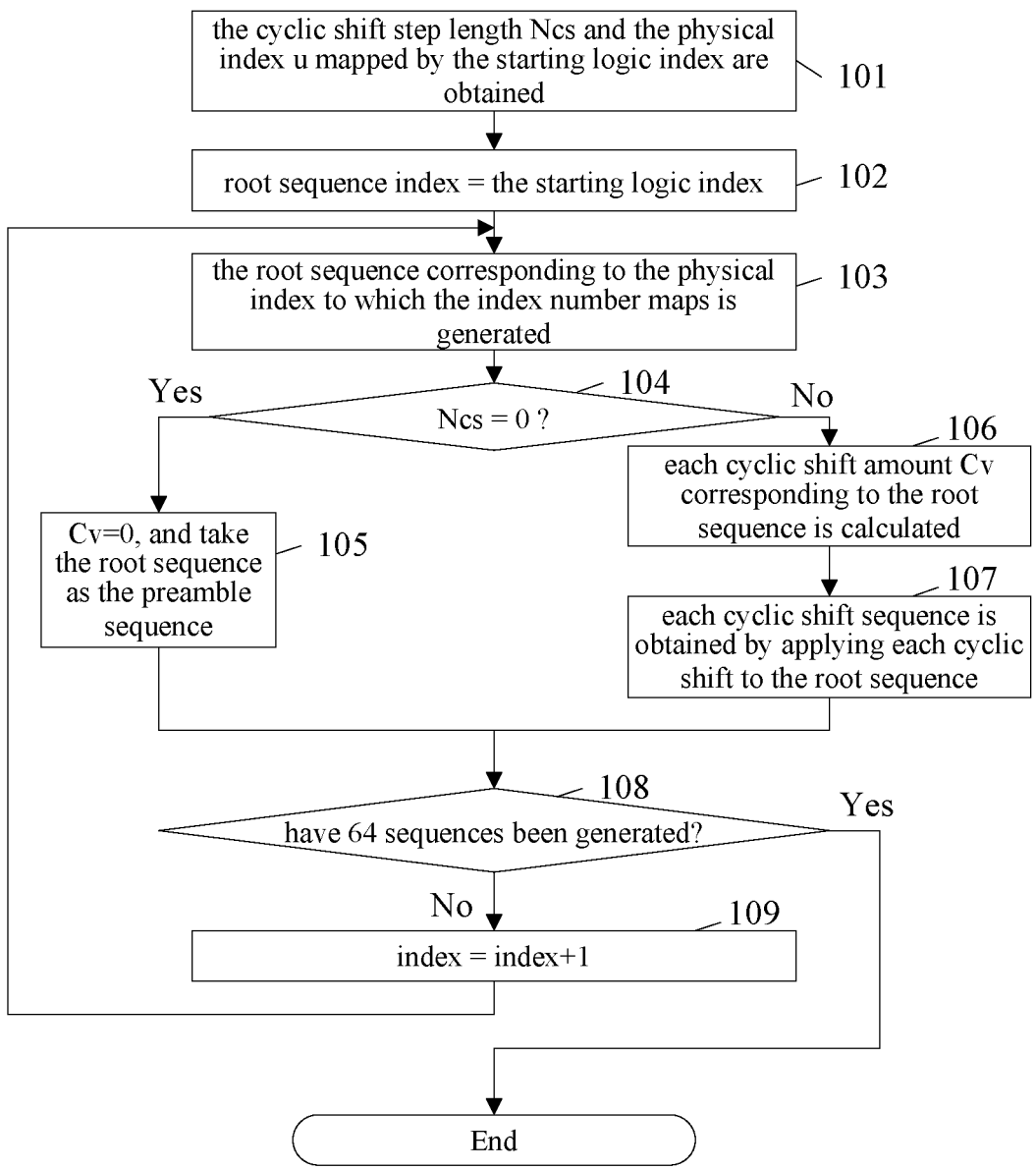

METHOD FOR GENERATING A PREAMBLE SEQUENCE AND A METHOD FOR DETERMINING A CYCLIC SHIFT

CROSS-REFERENCE TO RELATED APPLICATIONS

This application is a National Phase application of International Application No. PCT/CN2008/073314, filed Dec. 3, 2008, which claims the benefit of Chinese Patent Application No. 200810141979.9, filed Aug. 21, 2008, both of which are incorporated herein by reference in their entirety.

FIELD OF THE INVENTION

The present invention relates to wireless communication field, in particular to a method for generating a preamble sequence and a method for determining a cyclic shift.

BACKGROUND OF THE INVENTION

In LTE (Long Term Evolution) system, an RACH (Random Access Channel) uses the cyclic shift sequence of Zadoff-Chu (ZC) sequence as a preamble, such a cyclic shift sequence can also be called as a ZCZ (Zero Correlation Zone) sequence.

In an actual system, after being powered on, a terminal first performs a downlink synchronization, and then detects BCH (Broadcast Channel) A BS (Base Station) informs the terminal, through the BCH, a cyclic shift step length $N_{CS}$ and a first ZC root sequence index used for the RACH in the current cell, the terminal takes advantage of a certain mapping rule to calculate the sequence number of the corresponding ZC sequence according to the index, then generates a usable ZCZ sequence as the preamble sequence according to the cyclic shift step length $N_{CS}$ and a certain "cyclic shift limitation rule". If the number of the preamble sequence is less than a threshold M, the terminal automatically increments the ZC sequence index, and continues to generate a ZCZ sequence by using the next ZC sequence until the total number of the ZCZ sequences is bigger than or equal to the above threshold. Finally, the terminal randomly selects one sequence from all the usable ZCZ sequences generated as the preamble and transmits it.

For a ZC sequence with a sequence length $N_{ZC}$, ($N_{ZC}-1$) different root ZC sequences may be obtained, wherein the $u^{th}$ root ZC sequence is defined as $$x_u(n) = e^{-j\frac{\pi u n(n+1)}{N_{ZC}}}, \quad 0 \leq n \leq N_{ZC} - 1.$$

The length of the ZC sequence is the length of the preamble sequence. In the LTE system, the length of the ZC sequence is 839, each cell has 64 sequences for the preamble, these 64 sequences may be different cyclic shifts from a same root sequence, or may be different cyclic shifts from different root sequences. For the $u^{th}$ root sequence, its cyclic shift sequence is $x_{u,v}(n)=x_u((n+C_v) \bmod N_{ZC})$, wherein $C_v$ is the cyclic shift amount, mod represents the remainder after an integer is divided by another integer. In the LTE, the cyclic shift used for generating the preamble sequence can be classified into a restricted set and an unrestricted set, wherein the restricted set (i.e., with cyclic shift restriction, which can also be called as a high speed set) considers the frequency offset effect resulted from high speed and can ensure that there is no overlap between the search windows of respective preamble sequences, but the cyclic shift amount $C_v$ used for generating the preamble sequence will be restricted; the unrestricted set (i.e., without cyclic shift restriction, which can also be called as a normal set) is applicable to the situation with little frequency offset, and the cyclic shift amount generated by its preamble sequence will not be restricted, and the value of the cyclic shift which generates the preamble is $C_v = v \cdot N_{CS}$, wherein $v=0, 1, 2, \ldots, \lfloor N_{ZC}/N_{CS} \rfloor - 1$, $\lfloor x \rfloor$ represents the maximum integer which is smaller than or equal to x, i.e., the floor operation of x. It can be seen that in the situation that there is not any cyclic shift restriction, the value of the cyclic shift is restricted by the cyclic shift step length, for example, according to the formula of the cyclic shift of the LTE unrestricted set, if $N_{CS}$ is 0, $\lfloor N_{ZC}/N_{CS} \rfloor$ is of no consequence.

SUMMARY OF THE INVENTION

The present invention is proposed considering the above problem that the value of the cyclic shift is restricted by the cyclic shift step length in the situation of unrestricted set in prior art, the present inventor aims to provide a method for generating a preamble sequence and a method for determining a cyclic shift so as to solve the above problem.

In order to realize the above objective, a method for generating a preamble sequence and a method for determining a cyclic shift is provided according to one aspect of the present invention.

The above method for generating a preamble sequence and the method for determining a cyclic shift comprise: when setting one root sequence can only generate one preamble sequence and there is not any cyclic shift restriction, set a cyclic shift step length $N_{CS}$ to be equal to 0 and a corresponding cyclic shift amount $C_v=0$, the root sequence is used as the preamble sequence; when setting one root sequence can generate a plurality of preamble sequences and there is no cyclic shift restriction, the cyclic shift step length $N_{CS}$ is not equal to 0, and at this time a corresponding cyclic shift amount $C_v = v \cdot N_{CS}$, wherein $v=0, 1, 2, \ldots, \lfloor N_{ZC}/N_{CS} \rfloor - 1$.

Further, the step that the root sequence is used as the preamble sequence mainly comprises: a $u^{th}$ ZC root sequence is generated according to a physical index u of the first ZC sequence of the present cell received from a broadcast channel, and this root sequence is used as the preamble sequence; the following steps are repeated until 64 preamble sequences are generated: generate a next root sequence and use it as the preamble sequence.

Further, in a situation that the preamble sequence is generated on the terminal side without cyclic shift restriction, the above method comprises: step A, the terminal receives the cyclic shift step length $N_{CS}$ and a physical index u of a first ZC sequence of the current cell from a broadcast channel, and generates a $u^{th}$ ZC root sequence; when setting one root sequence can only generate one preamble sequence, $N_{CS}$ is set to be equal to 0; step B, if $N_{CS}=0$, $C_v=0$, the terminal takes the root sequence as the preamble sequence; if $N_{CS}$ is another value, the terminal respectively performs cyclic shift on each root sequence according to each usable cyclic shift $C_v$ of the root sequence to obtain each preamble sequence, wherein $C_v = v \cdot N_{CS}$, v is each integer from 0 to $\lfloor N_{ZC}/N_{CS} \rfloor - 1$, comprising 0 and $\lfloor N_{ZC}/N_{CS} \rfloor - 1$, $\lfloor \ \rfloor$ represents a floor operation; step C, if the number of generated preamble sequence is equal to 64, it is ceased to generate the preamble sequence; otherwise, the process returns to step B when the terminal generates a next root sequence.

Further, in a situation that the preamble sequence is generated on the base station side without cyclic shift restriction, the above method comprises: step a, the base station generates a $u^{th}$ ZC root sequence according to a physical index u assigned to a first ZC sequence of the current cell; when setting one root sequence can only generate one preamble sequence, $N_{CS}$ is equal to 0; step b, if $N_{CS}$=0, set $C_v$=0, the base station takes the root sequence as the preamble sequence; if $N_{CS}$ is another value, the base station respectively performs cyclic shift on the root sequence according to each usable cyclic shift $C_v$ of the root sequence to obtain each preamble sequence, wherein $C_v$=v·$N_{CS}$, v is each integer from 0 to $\lfloor N_{ZC}/N_{CS} \rfloor$−1, comprising 0 and $\lfloor N_{ZC}N_{CS}$−1, $\lfloor$ $\rfloor$ represents a floor operation; step c, if the number of generated preamble sequence is 64, it is ceased to generate preamble sequence; otherwise, the process returns to step b when the base station generates a next root sequence.

A method for determining a cyclic shift in a situation of an unrestricted set is provided according to another aspect of the present invention The method for determining a cyclic shift in a situation of an unrestricted set according to the present invention comprises: when setting one root sequence can only generate one preamble sequence, set a cyclic shift step length to be equal to 0 and the corresponding cyclic shift amount $C_v$=0; when set one root sequence can generate a plurality of preamble sequences, the cyclic shift step length $N_{CS}$ being not equal to 0 and a cyclic shift amount $C_v$=v·$N_{CS}$, wherein v=0, 1, 2, . . . , $\lfloor N_{ZC}/N_{CS} \rfloor$−1.

By one of above technical solutions, by setting a reasonable cyclic shift when a root sequence generates a preamble sequence, the present invention can support the coverage of large cells and small cells and make the method for generating the preamble sequence easy and simple.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein:

FIG. 1 is a flow chart according to the embodiments of the present invention, showing the process that the terminal side generates the preamble sequence when there is no cyclic shift restriction.

DETAILED DESCRIPTION OF THE EMBODIMENTS

Function Overview

In the technical solution provided by the embodiments of the present invention, when one preamble sequence is generated by one root sequence, one reasonable cyclic shift is set, i.e., when setting one root sequence can only generate one preamble sequence, the cyclic shift step length $N_{CS}$ is set to be equal to 0, the corresponding cyclic shift amount $C_v$=0, and at this time the root sequence is directly used as the preamble sequence; and when setting one root sequence can generate a plurality of preamble sequences, the cyclic shift step length $N_{CS}$ is not equal to 0, and the corresponding cyclic shift amount $C_v$=v·$N_{CS}$, wherein v=0, 1, 2, . . . , $\lfloor N_{ZC}/N_{CS} \rfloor$−1. Compared with the prior art, the technical solution provided by the embodiments of the present invention can be suitable for the situation that one root sequence can only generate one preamble sequence when generating preamble sequences. And with this technical solution, the process of generating the preamble sequence is made easy and simple while satisfying a maximum coverage requirement of a system.

The technical solution of the present invention will be described hereinafter in detail in conjunction with the drawing and embodiments. It is to be noted that, the embodiments of the present application and the features of the embodiments can be combined with each other if there is no conflict.

The embodiments of the present invention are based on the following considerations:

The value of the cyclic shift step length $N_{CS}$ must be greater than or equal to the value obtained by multiplying the sum of RTT (Round Trip Time) and a multi-path delay spread with the sequence length and then dividing the resultant by the symbol time of the sequence. In this way, it can be ensured that different cyclic shift sequences of a same ZC root sequence can be distinguished at a receiver side, wherein the RTT is the total time that the signal transmits from the transmitter, arrives at the receiver, and returns to the transmitter. The RTT is proportional to the radius of cell, wherein the larger the radius of the cell, the longer the RTT, and accordingly, the value of the cyclic shift step length $N_{CS}$ will be greater.

For the situation that one root sequence can only generate one preamble sequence, for example, when a coverage of larger cell needs to be supported, due to a longer RTT, the value of the cyclic shift step length $N_{CS}$ will be larger than a half of the length of the ZC sequence i.e., $N_{CS}$>$N_{ZC}$/2, which will result in the situation that one root sequence can only generate one preamble sequence. At this moment, $N_{CS}$ is equal to the length of the ZC sequence, i.e., 839, which indicates that the root sequence is cyclically shifted by one cycle, which is actually equivalent to that the root sequence has not been cyclically shifted. It also implies that the preamble sequence generated when $N_{CS}$ is equal to the length of the ZC sequence, 839, is same as that generated when $N_{CS}$ is equal to 0, that is to say, the root sequence itself is the preamble sequence to be generated. However, if the cyclic shift formula for producing an unrestricted set in present LTE is used, $\lfloor N_{ZC}/N_{CS} \rfloor$ has nonsense when $N_{CS}$=0. Therefore, a proper value of the cyclic shift needs to be selected for the situation that one root sequence can only generate one preamble sequence, so as to the preamble sequence it generates can meet the requirement of the maximum coverage for a cell with a larger radius.

Based on the consideration of the above problem, the embodiment of the present invention puts forward a method for generating a preamble sequence, which is applied to the process for generating an RACH preamble sequence in a situation that the LTE system is in the unrestricted set, and the method comprises as follows.

When one root sequence can only generate one preamble sequence, the cyclic shift step length is set as $N_{CS}$=0, the corresponding cyclic shift amount is set as $C_v$=0, and at this time, the root sequence is directly used as the preamble sequence. Herein, that the root sequence is directly used as the preamble sequence is realized by the following operations: the u$^{th}$ ZC root sequence is generated according to the physical index u of the first ZC sequence of the present cell with this root sequence used as the preamble sequence; and the following step is repeated until 64 preamble sequences are generated: repeatedly generating the next sequence and using it as the preamble sequence.

When one root sequence can generate a plurality of preamble sequences, the cyclic shift step length $N_{CS}$ is not equal to 0, and the corresponding cyclic shift amount is set to be $C_v$=v·$N_{CS}$, wherein v=0, 1, 2, . . . , $\lfloor N_{ZC}/N_{CS} \rfloor$−1.

In the embodiment of the present invention, generating the preamble sequence on the terminal side in the situation of the unrestricted set comprises the following steps:

step A, the terminal receives the cyclic shift step length $N_{CS}$ and the physical index u of the first ZC sequence of the current cell from the broadcast channel and generates the $u^{th}$ ZC root sequence; when one root sequence can only generate one preamble sequence, let $N_{CS}=0$;

step B, if $N_{CS}=0$, $C_v=0$, and the terminal uses the root sequence as the preamble sequence; if $N_{CS}$ is another value, the terminal respectively performs cyclic shift on each root sequence according to each usable cyclic shift $C_v$ of this root sequence, to obtain each preamble sequence, wherein $C_v=v\cdot N_{CS}$, $v=0, 1, 2, \ldots, \lfloor N_{ZC}/N_{CS}\rfloor-1$, and $\lfloor x \rfloor$ represents a floor operation on x;

step C, if the number of the generated preamble sequences is 64, it is ceased to generate the preamble sequence; otherwise, the terminal generates a next root sequence and the process returns to step B.

In the embodiment of the present invention, generating the preamble sequence on the base station side in the situation of the unrestricted set comprises:

step a, the base station generates the $u^{th}$ ZC root sequence according to the physical index u of the first ZC sequence of the current cell; and when one root sequence can only generate one preamble sequence, $N_{CS}=0$;

step b, if $N_{CS}=0$, set $C_v=0$, with the base station taking the root sequence as the preamble sequence; and if $N_{CS}$ is another value, the base station respectively performs cyclic shift on the root sequence according to each usable cyclic shift $C_v$ of this root sequence to obtain each preamble sequence, wherein $C_v=v\cdot N_{CS}$, $v=0, 1, 2, \ldots, \lfloor N_{ZC}/N_{CS}\rfloor-1$, and $\lfloor x \rfloor$ represents a floor operation on x;

step c, if the number of the generated preamble sequences is 64, it is ceased to generate preamble sequence; otherwise, the base station generates a next root sequence and the process returns to step b.

According to the embodiment of the present invention, a method for determining cyclic shift is proposed, which is applied to an LTE system to determine RACH cyclic shift in the situation of the unrestricted set, and the method comprises as follows.

When setting that one root sequence can only generate one preamble sequence, a cyclic shift step length is set to be equal to 0, wherein a cyclic shift amount $C_v=0$ when the cyclic shift step length $N_{CS}$ is equal to 0; and when setting that one root sequence can generate a plurality of preamble sequences, the cyclic shift step length $N_{CS}$ is not equal to 0, and the cyclic shift amount $C_v=v\cdot N_{CS}$, wherein $v=0, 1, 2, \ldots, \lfloor N_{ZC}/N_{CS}\rfloor-1$.

FIG. 1 is the flow chart according to the embodiment of the present invention, showing the process that the terminal side generates the preamble sequence when there is no cyclic shift restriction, i.e., the flow that the terminal side generates 64 preamble sequences in the situation that there is no cyclic shift restriction, which is applied to the Frequency Division Duplex (FDD) mode in a LTE system, wherein the length of the preamble sequence is 839 (taking the sample as unit), i.e., the length of the ZC sequence $N_{ZC}=839$. As shown in FIG. 1, the flow comprises the following steps (Step 101-Step 109):

Step 101, the terminal side obtains the cyclic shift step length $N_{CS}$ and the physical index u to which the starting logic index of the first ZC sequence of the current cell maps according to the broadcast channel;

Step 102, let the root sequence index=the starting logic index;

Step 103, the ZC root sequence corresponding to the physical index to which the root sequence index maps is generated;

Step 104, it is judged whether $N_{CS}=0$, wherein if $N_{CS}$ is equal to 0, it goes to Step 105, otherwise, it goes to Step 106;

Step 105, the $(index)^{th}$ ZC sequence does not need the cyclic shift, and the $(index)^{th}$ ZC sequence is taken as the preamble sequence, the cyclic shift amount $C_v=0$, then it goes to Step 108;

Step 106, when $N_{CS}$ takes another value, each cyclic shift amount corresponding to the root sequence is calculated $C_v=v\cdot N_{CS}$, wherein $v=0, 1, 2, \ldots, \lfloor N_{ZC}/N_{CS}\rfloor-1$;

Step 107, the cyclic shift is performed on the root sequence according to the cyclic shift amount $C_v$ available for the root sequence in Step 106, and the preamble sequence generated is the corresponding cyclic shift sequence;

Step 108, it is judged whether 64 preamble sequences are generated, wherein if 64 preamble sequences have already be generated, the flow ends, otherwise, it goes to Step 109;

Step 109, let the index plus 1, then it goes back to Step 103.

For the unrestricted set of the LTE, there is no cyclic shift restriction, and the value of the cyclic shift for generating the preamble sequence $C_v=v\cdot N_{CS}$, wherein $v=0, 1, 2, \ldots, \lfloor N_{ZC}/N_{CS}\rfloor-1$, and $\lfloor x \rfloor$ represents the maximum integer less than or equal to x, which indicates that the preambles with the number of $N_{pre}=\lfloor N_{ZC}/N_{CS}\rfloor$ ZCZ may be generated for a given $N_{CS}$ and sequence length $N_{ZC}$.

The greater $N_{CS}$ is, the greater the radius of the cell being supported is. However, the number of the ZCZ preamble that can be generated in one root sequence is smaller. When $N_{CS}=419$, the maximum radius of the cell being supported is less than 60 kilometers, and the number of the ZCZ preamble that can be generated in one root sequence is merely 2.

For the situation that a cell has a very large radius, for example, the radius of the cell is 100 kilometers, the value of $N_{CS}$ must be very large so as to overcome the effects of the round trip delay and the multi-path delay spread. At this time, one root sequence can only generate one preamble sequence. When the value of $N_{CS}$ is between 0 and 839, there always is a process of the root sequence generating the preamble sequence by cyclic shift. When the value of $N_{CS}$ is 0 or 839, it means that the root sequence is directly used as the preamble sequence and there is no cyclic shift process. If the value of $N_{CS}$ is 0, $\lfloor N_{ZC}/N_{CS}\rfloor$ will have nonsense. In order to solve this problem, when the value of $N_{CS}$ is 0, it is set that the cyclic shift amount $C_v=0$. While for the situation that $N_{CS}$ is not equal to 0, the cyclic shift formula for generating the preamble when there is no cyclic shift restriction, $C_v=v\cdot N_{CS}$, is still used, wherein $v=0, 1, 2, \ldots, \lfloor N_{ZC}/N_{CS}\rfloor-1$.

It can be seen from above description that the embodiment of the present invention is suitable for the situation that one root sequence can only generate one preamble sequence, wherein it can be prevented during the cyclic shift calculation that divisor is 0 resulting from the value of $N_{CS}$ And the method for generating the preamble sequence is very simple, i.e., the root sequence is directly used as the preamble sequence.

Obviously, those skilled in the art shall understand that individual modules and steps of the present invention can be implemented with general computing devices, they may be integrated in a single computing device or distributed in network formed by a plurality of computing devices, optionally, they may be implemented by using program codes executable by computing devices, thus they may be stored in memory devices for execution by the computing devices, or implemented by making them into integrated circuit module respectively, or by making several modules or steps in to a single IC. Thus, the present invention is not limited to any particular combination of hardware and software.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for generating a preamble sequence and determining a cyclic shift, comprising:

when one root sequence can only generate one preamble sequence and there is not any cyclic shift restriction, setting a cyclic shift step length $N_{CS}$ to be equal to 0 and a corresponding cyclic shift amount $C_v=0$, at this time the root sequence being used as the preamble sequence directly;

when one root sequence can generate a plurality of preamble sequences and there is no cyclic shift restriction, the cyclic shift step length $N_{CS}$ being not equal to 0, and at this time, setting a corresponding cyclic shift amount $C_v=v \cdot N_{CS}$, wherein $v=0, 1, 2, \ldots, \lfloor N_{ZC}/N_{CS} \rfloor - 1$, $N_{ZC}$ represents a sequence length, $\lfloor \, \rfloor$ represents a floor operation.

2. The method according to claim 1, wherein the step of the root sequence being used as the preamble sequence directly comprises:

a $u^{th}$ Zadoff-Chu (ZC) root sequence is generated according to a physical index u of a first ZC sequence of a present cell received from a broadcast channel, and the $u^{th}$ root sequence is used as the preamble sequence;

the following steps are repeated until 64 preamble sequences are generated: generate a next root sequence and use the generated next root sequence as the preamble sequence.

3. The method according to claim 2, wherein the step of generating the preamble sequence on a terminal side in a situation that there is not any cyclic shift restriction comprises in particular:

step A, the terminal receives the cyclic shift step length $N_{CS}$ and a physical index u of a first ZC sequence of a current cell from a broadcast channel, and generates a $u^{th}$ ZC root sequence; when one root sequence can only generate one preamble sequence, $N_{CS}$ is set equal to 0;

step B, if $N_{CS}=0$, set $C_v=0$ and the terminal takes the root sequence as the preamble sequence; if $N_{CS}$ is another value, the terminal respectively performs cyclic shift on each root sequence according to each usable cyclic shift $C_v$ of the root sequence to obtain each preamble sequence, wherein $C_v=v \cdot N_{CS}$, v is each integer from 0 to $\lfloor N_{ZC}/N_{CS} \rfloor - 1$ which comprising 0 and $\lfloor N_{ZC}/N_{CS} \rfloor - 1$, $\lfloor \, \rfloor$ represents a floor operation;

step C, if the number of generated preamble sequences is equal to 64, stop generating the preamble sequence; otherwise, return to step B when the terminal generates a next root sequence.

4. The method according to claim 3, wherein the step of generating the preamble sequence on the base station side in a situation that there is not any cyclic shift restriction comprises in particular:

step a, the base station generates a $u^{th}$ ZC root sequence according to a physical index u of a first ZC sequence of the current cell; when one root sequence can only generate one preamble sequence, $N_{CS}$ is set equal to 0;

step b, if $N_{CS}=0$, set $C_v=0$ and the base station takes the root sequence as the preamble sequence; if $N_{CS}$ is another value, the base station respectively performs cyclic shift on the root sequence according to each usable cyclic shift $C_v$ of the root sequence to obtain each preamble sequence, wherein $C_v=v \cdot N_{CS}$, v is each integer from 0 to $\lfloor N_{ZC}/N_{CS} \rfloor - 1$ which, comprising 0 and $\lfloor N_{ZC}/N_{CS} \rfloor - 1$, $\lfloor \, \rfloor$ represents a floor operation;

step c, if the number of generated preamble sequence is 64, stop generating the preamble sequence; otherwise, return to step b when the base station generates a next root sequence.

5. The method according to claim 2, wherein the step of generating the preamble sequence on the base station side in a situation that there is not any cyclic shift restriction comprises in particular:

step a, the base station generates a $u^{th}$ ZC root sequence according to a physical index u of a first ZC sequence of a current cell; when one root sequence can only generate one preamble sequence, $N_{CS}$ is set equal to 0;

step b, if $N_{CS}=0$, set $C_v=0$ and the base station takes the root sequence as the preamble sequence; if $N_{CS}$ is another value, the base station respectively performs cyclic shift on the root sequence according to each usable cyclic shift $C_v$ of the root sequence to obtain each preamble sequence, wherein $C_v=v \cdot N_{CS}$, v is each integer from 0 to $\lfloor N_{ZC}/N_{CS} \rfloor - 1$ which, comprising 0 and $\lfloor N_{ZC}/N_{CS} \rfloor - 1$, $\lfloor \, \rfloor$ represents a floor operation;

step c, if the number of generated preamble sequence is 64, stop generating the preamble sequence; otherwise, the return to step b when the base station generates a next root sequence.

6. The method according to claim 1, wherein the step of generating the preamble sequence on a terminal side in a situation that there is not any cyclic shift restriction comprises in particular:

step A, the terminal receives the cyclic shift step length $N_{CS}$ and a physical index u of a first Zadoff-Chu (ZC) sequence of a current cell from a broadcast channel, and generates a $u^{th}$ ZC root sequence; when one root sequence can only generate one preamble sequence, $N_{CS}$ is set equal to 0;

step B, if $N_{CS}=0$, set $C_v=0$ and the terminal takes the root sequence as the preamble sequence; if $N_{CS}$ is another value, the terminal respectively performs cyclic shift on each root sequence according to each usable cyclic shift $C_v$ of the root sequence to obtain each preamble sequence, wherein $C_v=v \cdot N_{CS}$, v is each integer from 0 to $\lfloor N_{ZC}/N_{CS} \rfloor - 1$ which comprising 0 and $\lfloor N_{ZC}/N_{CS} \rfloor - 1$, $\lfloor \, \rfloor$ represents a floor operation;

step C, if the number of generated preamble sequences is equal to 64, stop generating the preamble sequence; otherwise, return to step B when the terminal generates a next root sequence.

7. The method according to claim 6, wherein the step of generating the preamble sequence on the base station side in a situation that there is not any cyclic shift restriction comprises in particular:

step a, the base station generates a $u^{th}$ ZC root sequence according to a physical index u of a first ZC sequence of the current cell; when one root sequence can only generate one preamble sequence, $N_{CS}$ is set equal to 0;

step b, if $N_{CS}=0$, set $C_v=0$ and the base station takes the root sequence as the preamble sequence; if $N_{CS}$ is another value, the base station respectively performs cyclic shift on the root sequence according to each usable cyclic shift $C_v$ of the root sequence to obtain each preamble sequence, wherein $C_v=v \cdot N_{CS}$, v is each integer from 0 to $\lfloor N_{ZC}/N_{CS}-1$ which comprising 0 and $\lfloor N_{ZC}/N_{CS} \rfloor - 1$, $\lfloor \, \rfloor$ represents a floor operation;

step c, if the number of generated preamble sequence is 64, stop generating the preamble sequence; otherwise, returns to step b when the base station generates a next root sequence.

8. The method according to claim 1, wherein the step of generating the preamble sequence on a base station side in a situation that there is not any cyclic shift restriction comprises in particular:

step a, the base station generates a $u^{th}$ Zadoff-Chu (ZC) root sequence according to a physical index u of a first ZC sequence of a current cell; when one root sequence can only generate one preamble sequence, $N_{CS}$ is set equal to 0;

step b, if $N_{CS}=0$, set $C_v=0$ and the base station takes the root sequence as the preamble sequence; if $N_{CS}$ is another value, the base station respectively performs cyclic shift on the root sequence according to each usable cyclic shift $C_v$ of the root sequence to obtain each preamble sequence, wherein $C_v=v \cdot N_{CS}$, v is each integer from 0 to $\lfloor N_{ZC}/N_{CS} \rfloor -1$ which, comprising 0 and $\lfloor N_{ZC}/N_{CS} \rfloor -1$, $\lfloor \ \rfloor$ represents a floor operation;

step c, if the number of generated preamble sequence is 64, stop generating the preamble sequence; otherwise, return to step b when the base station generates a next root sequence.

9. A method for determining a cyclic shift in a situation of an unrestricted set, comprising:

when one root sequence can only generate one preamble sequence, setting a cyclic shift step length $N_{CS}$ to be equal to 0 and the corresponding cyclic shift amount $C_v=0$; when one root sequence can generate a plurality of preamble sequences and the cyclic shift step length $N_{CS}$ being not equal to 0, setting a cyclic shift amount $C_v=v \cdot N_{CS}$, wherein $v=0, 1, 2, \ldots, \lfloor N_{ZC}/N_{CS} \rfloor -1$, $N_{ZC}$ represents a sequence length, $\lfloor \ \rfloor$ represents a floor operation.

* * * * *